US011218669B1

(12) United States Patent
Benman (10) Patent No.: US 11,218,669 B1
(45) Date of Patent: Jan. 4, 2022

(54) SYSTEM AND METHOD FOR EXTRACTING AND TRANSPLANTING LIVE VIDEO AVATAR IMAGES

(71) Applicant: William J. Benman, Marina Del Rey, CA (US)

(72) Inventor: William J. Benman, Marina Del Rey, CA (US)

( * ) Notice: Subject to any disclaimer, the term of this patent is extended or adjusted under 35 U.S.C. 154(b) by 0 days.

(21) Appl. No.: 16/899,760

(22) Filed: Jun. 12, 2020

(51) Int. Cl.
*G06T 7/55* (2017.01)
*H04N 7/15* (2006.01)
*G06T 19/00* (2011.01)

(52) U.S. Cl.
CPC .............. *H04N 7/157* (2013.01); *G06T 7/55* (2017.01); *G06T 19/006* (2013.01); *G06T 2207/10016* (2013.01); *G06T 2207/10028* (2013.01)

(58) Field of Classification Search
CPC ......... H04N 7/157; G06T 19/006; G06T 7/55; G06T 2207/10016; G06T 2207/10028
See application file for complete search history.

(56) References Cited

U.S. PATENT DOCUMENTS

| 5,784,546 | A | 7/1998 | Benman |
| 5,966,130 | A | 10/1999 | Benman |
| 6,798,407 | B1 | 9/2004 | Benman |
| 7,755,635 | B2 | 7/2010 | Benman |
| 7,839,399 | B2 | 11/2010 | Benman |
| 2006/0285747 | A1* | 12/2006 | Blake ...................... G06T 7/254 382/180 |
| 2016/0224845 | A1* | 8/2016 | Gyger ....................... G06T 7/20 |
| 2017/0019627 | A1* | 1/2017 | Wan ........................ G06T 7/285 |
| 2017/0237941 | A1* | 8/2017 | Vats ........................ H04N 7/157 348/14.07 |
| 2018/0074332 | A1* | 3/2018 | Li ............................ G06F 3/012 |
| 2018/0164103 | A1* | 6/2018 | Hill ........................ G06Q 30/02 |
| 2019/0266774 | A1* | 8/2019 | Sommerlade ........... A63F 13/86 |

* cited by examiner

*Primary Examiner* — Tapas Mazumder (57) ABSTRACT

A system for extracting and transplanting live video avatar images including a depth sensor for creating a depth map based first live video avatar of a user or object disposed in a heterogeneous first environment with an arbitrary background; a processor coupled to the depth sensor; code fixed in a tangible medium for execution by the processor for extracting the depth map from the first environment to provide an extracted depth map based live video avatar; and a display system coupled to the processor for showing the extracted depth map based live video avatar in a second environment diverse from the first environment. In a second embodiment, the system includes a camera coupled to the processor to provide live video images of the user in the first environment and code for spatially filtering the images to provide a spatially filtered extracted second live video avatar. This embodiment further includes code for combining the first live video avatar with the second live video avatar to provide an enhanced extracted depth map based third live video avatar. Images from multiple cameras and or depth sensors are combined simultaneously to provide the third live video avatar using the spatially enhanced extracted depth map. A routing server is included for receiving streams from multiple users and sending to each user the live video avatar images from other users based on their locations in a shared space or for use in a local user's AR environment.

18 Claims, 6 Drawing Sheets

Figure 6(c) Virtual Conferencing Mode

Figure 6(d) Mixed Reality Conferencing Mode

Figure 6(b) Extracted Silhouette

Figure 6(a) Video Conferencing Mode

SYSTEM AND METHOD FOR EXTRACTING AND TRANSPLANTING LIVE VIDEO AVATAR IMAGES

BACKGROUND OF THE INVENTION

Field of the Invention

This invention relates to image and audio processing systems and techniques for computing and communications applications. More specifically, this invention relates to systems and method for communicating in and through virtual and augmented reality environments.

Description of the Related Art

U.S. Pat. No. 5,966,130 entitled INTEGRATED VIRTUAL NETWORKS issued Jul. 21, 1998, to W. J. Benman, the teachings of which are incorporated herein by reference and hereinafter referred to as the '130 patent, disclosed and claimed a computer-based system which allows a user to see a realistic three-dimensional representation of an environment, such as an office, on a computer screen. Real world functionality is mapped onto numerous objects in the environment with a motion based input system allowing the user to use the objects in the environment (e.g., computer, desk, file cabinets, documents, etc.) in same manner as the objects would be used in the real world.

In addition, Benman's system allows the user to travel into the work areas of coworkers and see and interact with live images of the coworkers in the environment. In order to display an image of the user or a coworker in the environment, it is necessary to remove any background imagery inconsistent with the computer-generated environment from the transplanted image prior to display. For example, if the coworker is in a remote office using a computer equipped with software effective to create a virtual environment as described by Benman, and the user has a wall, window, bookshelf or other scene in the background, that information would have to be removed in order to place the person's image into the virtual environment in such a way as to create an image of the person sitting in the computer generated office environment.

Use of monochromatic (e.g., blue and green) screens have been used in television and film productions to extract a foreground image and overlay it over a background image. For example, this process is used daily in television to allow a person standing in front of a blue screen to have their image extracted and combined with a video image of a map to provide a weather report.

However, it would be impractical to require each coworker located in an office, hotel, home or other environment to have a monochromatic background. Accordingly, there was a need for an image processing system or technique which could transplant a desired image from one scene into another scene regardless of the background in the first scene.

The need in the art was addressed by U.S. Pat. No. 6,798,407, entitled SYSTEM AND METHOD FOR PROVIDING A FUNCTIONAL VIRTUAL ENVIRONMENT WITH REAL TIME EXTRACTED AND TRANSPLANTED IMAGES by William J. Benman, issued Sep. 28, 2004, and U.S. Pat. No. 5,966,130, INTEGRATED VIRTUAL NETWORKS by William J. Benman, issued Oct. 12, 1999, the teachings of both of which are incorporated herein by reference, disclose and claim systems for enabling users to see and interact with each other as live images in computer generated environments in real time. This technology is named Silhouette® and will soon be offered as a service via a highly realistic computer generated environment called the Nexos[SM] by Integrated Virtual Networks, Inc. of Los Angeles, Calif.

The referenced applications disclose illustrative embodiments of Silhouette utilizing a spatial filtering scheme to effect extraction of each user's image, though not limited thereto. Unfortunately, it is often difficult to obtain acceptable image quality at the edges of, aka the 'silhouette' of, the user's video image due to a variety of optical effects measurement inaccuracies etc. Hence, there is a need in the art for a system or method for further improving the image quality of Silhouette live video avatars, particularly along the edges thereof.

SUMMARY OF THE INVENTION

The need in the art is addressed by the system for extracting and transplanting live video avatar images of the present invention. In one embodiment, the invention includes a depth sensor for creating a depth map based first live video avatar of a user or object disposed in a heterogeneous first environment with an arbitrary background; a processor coupled to the depth sensor; code fixed in a tangible medium for execution by the processor for extracting the depth map from the first environment to provide an extracted depth map based live video avatar; and a display system coupled to the processor for showing the extracted depth map based live video avatar in a second environment diverse from the first environment.

In a second embodiment, the system includes a camera coupled to the processor to provide live video images of the user in the first environment and code for spatially filtering the images to provide a spatially filtered extracted second live video avatar. This embodiment further includes code for combining the first live video avatar with the second live video avatar to provide an enhanced extracted depth map based third live video avatar. Images from multiple cameras and or depth sensors are combined simultaneously to provide the third live video avatar using the spatially enhanced extracted depth map.

In a third embodiment, the inventive system includes code for extracting a live video avatar from film or video. Another embodiment includes an arrangement with multiple displays for sensing a position of a user with automatic camera, display, microphone and or speaker activation and switching based on user position and viewing angle.

A routing server is included for receiving streams from multiple users and sending to each user the live video avatar images from other users based on their locations in a shared space or for use in a local user's AR environment.

Numerous additional benefits and features are disclosed and claimed herein.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. Illustrative embodiments and exemplary applications will now be described to disclose the advantageous teachings of the present invention.

U.S. Pat. No. 6,798,407, SYSTEM AND METHOD FOR PROVIDING A FUNCTIONAL VIRTUAL ENVIRONMENT WITH REAL TIME EXTRACTED AND TRANSPLANTED IMAGES by William J. Benman, issued Sep. 28, 2004, and U.S. Pat. No. 5,966,130, INTEGRATED VIRTUAL NETWORKS by William J. Benman, issued Oct. 12, 1999, the teachings of both of which are incorporated herein by reference, disclose and claim systems for enabling users to see and interact with each other as live images in computer generated environments in real time.

This technology is called Silhouette® and is currently offered as a service via a highly realistic computer generated environment called the Nexos$^{SM}$ by Integrated Virtual Networks, Inc. (aka 'IVN') of Los Angeles, Calif.

The referenced applications disclose illustrative embodiments of Silhouette utilizing a spatial filtering scheme to effect extraction of each user's image, though not limited thereto. As noted above, there is a need to improve the edge detection performance of this Silhouette spatial filtering technique.

As discussed more fully below, in accordance with the present teachings, depth sensing technology is used to improve edge detection performance in Silhouette systems.

Figure 1:
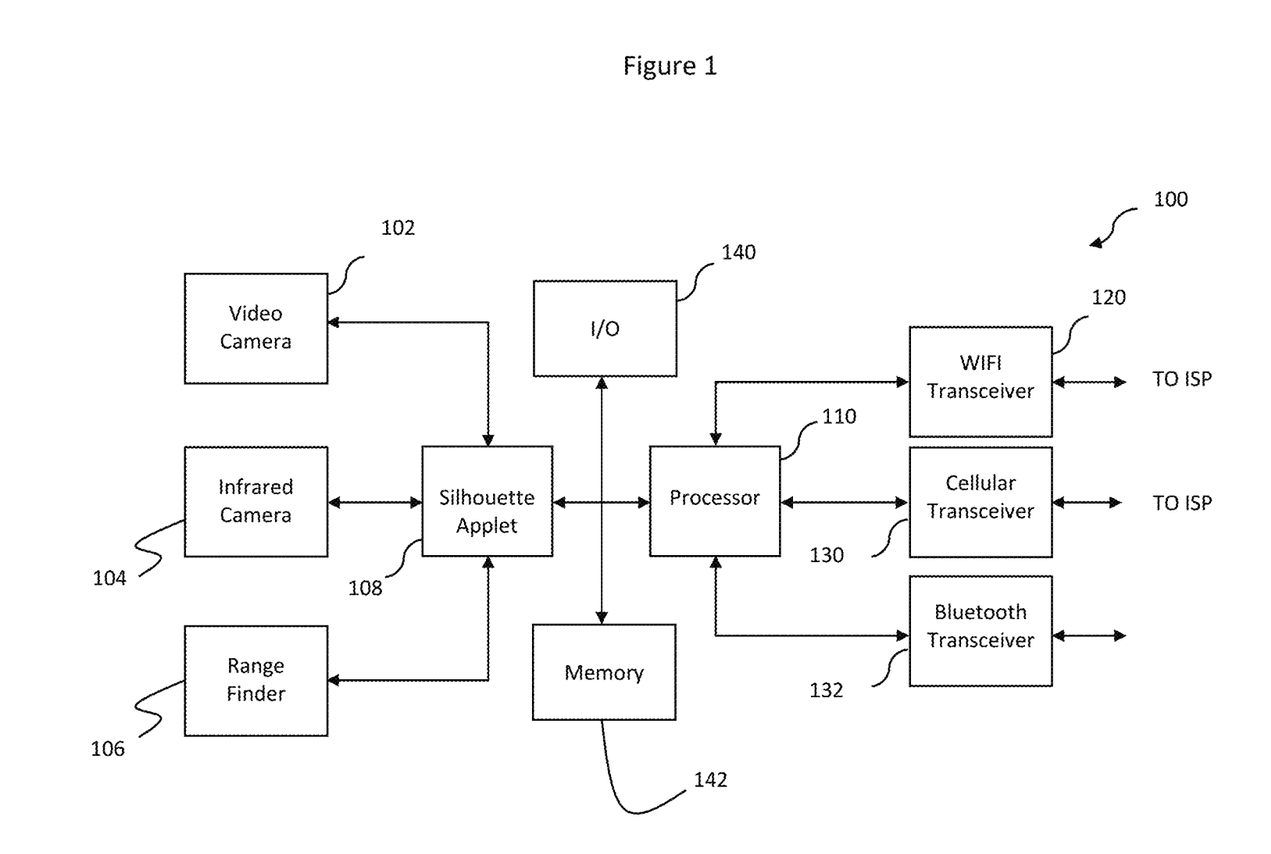
FIG. 1 is a block diagram of an illustrative implementation of a mobile wireless platform configured to send and receive Silhouette streams in accordance with the present teachings.

Depth Based Extraction:

FIG. 1 is a block diagram of an illustrative implementation of a mobile wireless platform configured to send and receive Silhouette streams in accordance with the present teachings. As shown in FIG. 1, in accordance with the teachings of the present invention, live video (Silhouette) avatars are created on mobile platforms (e.g. smartphones) 100 with forward and/or rearward facing cameras 102. Depth data is provided by the video camera 102, an infrared camera 104 or a range finder (such as a laser range finder) 106. The user's live video image is extracted from the user's background by a Silhouette applet 108. The applet is software (referred to herein as 'code') stored in a tangible medium (memory 142) and executed by a processor 110.

In the best mode, the applet extracts the Silhouette using any technique for creating a depth map such as binocular, triangulation or dual camera disparity, TrueDepth sensing, focus pixels, optical (e.g. laser), acoustic and/or other range finding methods currently known in the art. For an excellent article on this, see *iPhone XR: A Deep Dive Into Depth*, published Oct. 29, 2018 by B. Sandofsky. (https://blog.halide.cam/iphone-xr-a-deep-dive-into-depth-47d36ae69a81.) See also: https://en.wikipedia.org/wiki/Range_imaging.

Dual Mode Extraction:

As is well known in the art, the processing of depth data, particularly for video at the real time frames required for Silhouette, is computationally intense and requires large amounts of memory and, in Silhouette, bandwidth.

Hence, an additional feature of the present invention is the provision of a scheme by which the heavy data processing, storage and transmission typically associated with the creation and use of depth data is minimized. Where the data and processing load is too heavy using one or more of these depth sensing technologies, the optional additional solution provided by the present teachings is to combine the depth sensing operation with the Benman spatial filtering operation to provide improved edge detection performance without the heavy data processing and/or storage typically associated with the creation and handing of depth data.

This is achieved by using edge data from depth sensing to provide a boundary for a mask in a key frame, at a much lower frame rate, to set an edge around a user (aka a 'silhouette') within which the spatial filtering operation is thereafter performed on all the frames at a high (e.g. real time) frame rate. The spatial filtering is then performed with an exclusive NOR operation during a pixel by pixel comparison of a current video image frame to a reference frame obtained with the subject out of sight of the camera or by other suitable means such as by simply detecting movement of the user.

Figure 2:
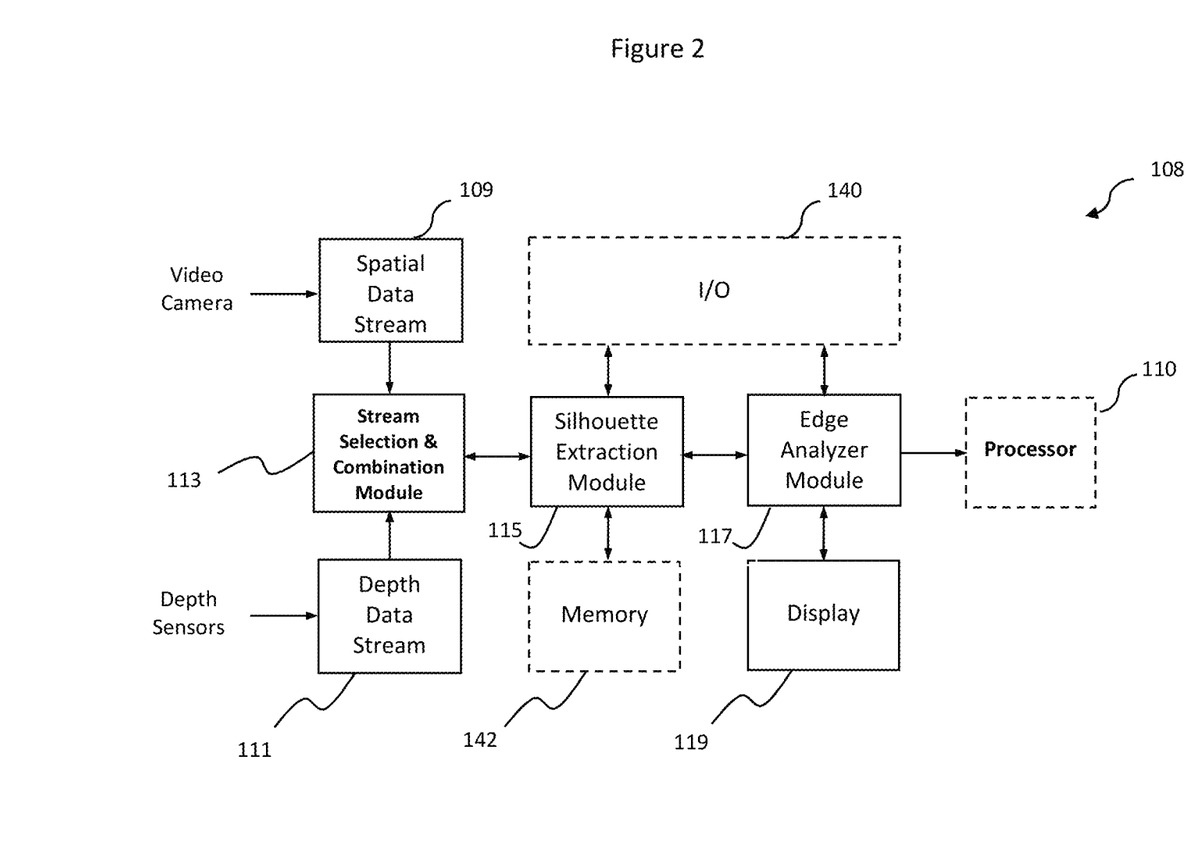
FIG. 2 is a flow diagram showing the Silhouette applet of the present invention in more detail.

FIG. 2 is a flow diagram showing the Silhouette applet 108 of FIG. 1 in more detail. As shown in FIG. 2, the applet 108 includes a spatial data stream buffer or module 109 coupled to the video camera 102 of FIG. 1 and a depth data stream buffer or module 111 coupled to the depth sensors 102, 104 and 106 of FIG. 1. The spatial filter data stream is fed to a Silhouette live video extraction module 115 through a stream selection and combination module 113.

As disclosed in the above referenced Benman patents, the Silhouette extraction module captures and extracts a user's live video imagery from the user's physical heterogeneous environment without requiring the use of a homogenous monochromatic background such as a blue screen or a green screen as is common in film and television production.

A key feature of the present invention resides in the fact that the live video Silhouette avatar, extracted by the extraction module 115, is sent to an edge analyzer module 117. The edge analyzer module 117 either automatically assesses extraction edge quality or responds to a manual inspection of edge quality perceived by the user via the display and signaled by the user via the user interface 140.

If the edge analyzer module 117 is operating in 'automatic edge detection and optimization mode' the edge analyzer 117 assesses edge quality using any of many known image analysis techniques. See "Edge Detection" in Wikipedia at https://en.wikipedia.org/wiki/Edge_detection.

In accordance with the present teachings, the edge analyzer 117 examines the edges of the spatially filtered data stream by checking on a pixel by pixel basis for optical noise around the periphery of the extracted live video avatar for all or a subset of the live video avatar image frames.

The edges of the live video avatar extracted by the extraction module from the depth data stream are also automatically assessed by the edge analyzer module 117. Once again, optical noise is assessed along the edges of the user's live video avatar image stream. The edge analyzer 117 then selects the live video avatar with the best edge performance for handling by the processor 110.

It should be noted that, in accordance with the present teachings, the edge analyzer 117 can also select a stream that is a combination of spatial image data and depth sensed image data. That is, the user's image may be based on the spatial image processed data stream as to the bulk of the user's face and body, and the edge data pixels may be provided by the depth image data processed stream and vice versa.

This approach enables the user or the analyzer the take the best imagery from either stream as to the bulk of the image along with the best edges, regardless of the source of each. This is useful inasmuch as depth sensed data streams are subject to distortion, discoloration and other errors and artifacts that limit image quality. Moreover, the processing of depth data tends to burden processors, memory and bandwidth capabilities of the system.

Further, as mentioned above and discussed in the Benman patents, live video avatars based on spatial image processing, while offering excellent image quality, often suffer from undesirable edge effects.

For these and other reasons, the present invention takes the best of both techniques, when needed and/or necessary, and allows user input as to the best image stream.

In one embodiment, this 'dual mode' embodiment employing depth data and spatially filtered data, a mask and a logic operation can be utilized. The mask is provided by the depth map. Within the mask, the logical AND operation is executed between the RGB pixels from the depth sensor and the RGB pixels from the spatial filter. Pixels from the spatial filter outside the edges detected will be discarded. Pixels resulting from the AND operation within the silhouette will be passed on for processing, transmission, reception, transplantation and display. This results in better edge detection than conventional spatial filtering schemes without the data load typically associated with depth sensing of video images at real time frame rates.

In this embodiment, a depth map is combined with the result of the exclusive NOR operation to yield a point cloud of RGB-D or RGBA-D data. This data stream is bundled with user location data in a VR or AR environment and forwarded through the processor 110 to a server 20 (FIG. 3) for routing in accordance with the teachings of the above-referenced Benman patents as discussed more fully below. However, the invention is not limited to the method by which the depth map data and the spatially filtered data are cross-correlated and/or combined.

Each of the modules in FIG. 2 may be implemented in software and/or hardware. If implemented in software, the modules may be stored as code in memory 142 and executed by the processor 110.

The output of the edge analyzer module is fed into the processor 110 of FIG. 1.

Mobile Platform Implementation:

As shown in FIG. 1, the platform 100, may be a PC, Smartphone, tablet or other suitable wireless computing and communications device. However, in the illustrative embodiment, the platform is a Smartphone or Tablet. In either case, the platform processor 110 communicates with a routing server 20 (see FIG. 3) via a WiFi transceiver 120 and/or a cellular transceiver 130 in response to commands from a user via a conventional input/output interface 140.

Figure 3:
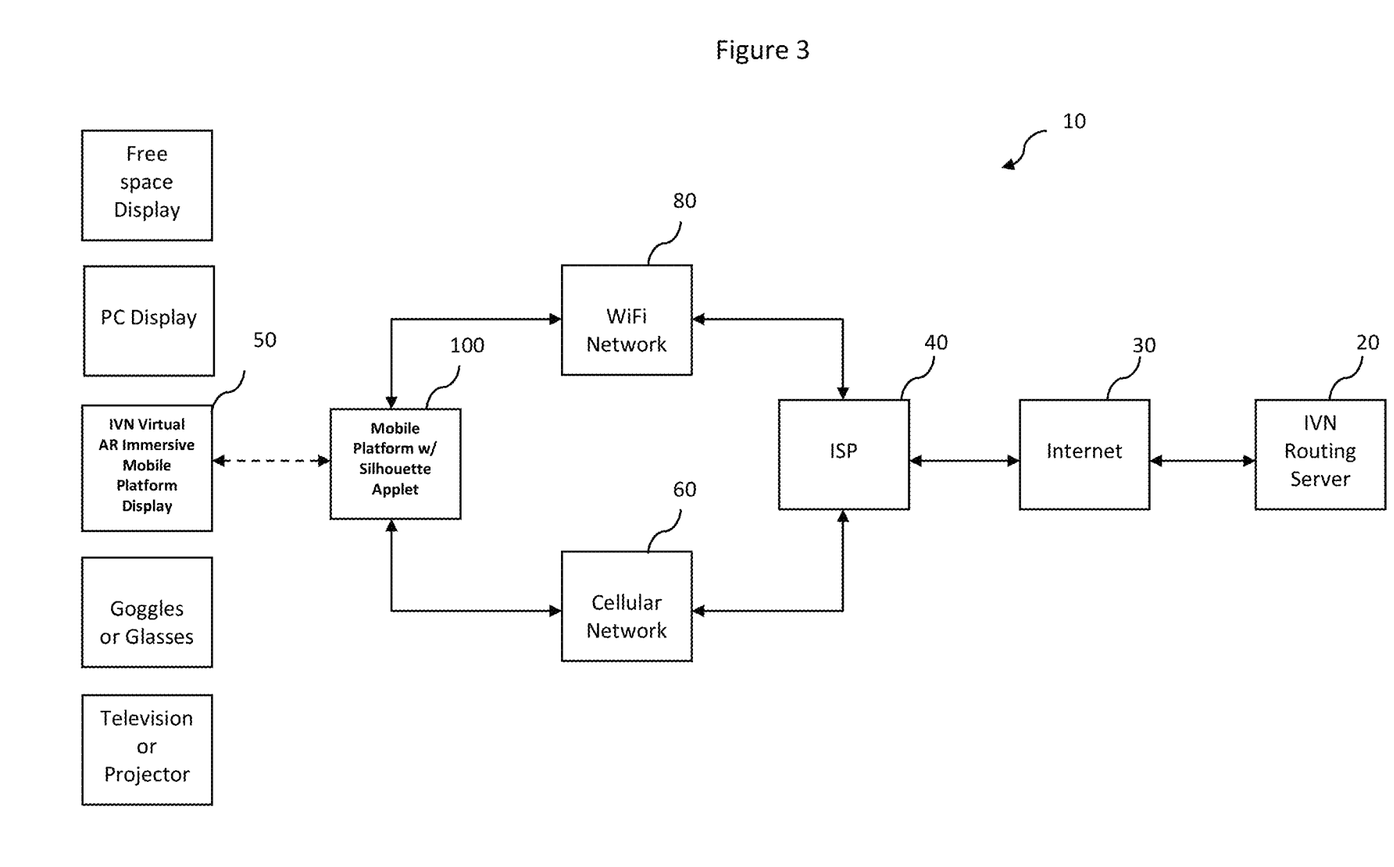
FIG. 3 is a block diagram of an illustrative implementation of a system for capturing and displaying Silhouette imagery via the mobile wireless platform of FIG. 1 in connection with the teachings of the present invention.

FIG. 3 is a block diagram of an illustrative implementation of a system 10 for capturing and displaying Silhouette imagery via the mobile wireless platform 100 of FIG. 1 in connection with the teachings of the present invention. The system 10 includes the routing server 20 adapted to route extracted video and audio streams received from remote client machines in accordance with the above referenced Benman patents and applications. The image and audio data streams are communicated between the server 20 and a platform client 100 via either a cellular network 60 or a WiFi receiver 80, an Internet Service Provider 40 and the Internet 30. Those of ordinary skill in the art will appreciate that the present teachings are not limited to the Internet and may be implemented on an Intranet or a circuit switched network without departing from the scope of the present teachings.

In receive mode, the Silhouette applet 108 receives spatial filter enhanced RGB-D or RGBA-D streams from the routing server 20 and outputs the extracted image data to an onboard display (not shown) or a remote display via a WiFi transceiver 120 or a Bluetooth transceiver 132. Obviously, a wired connection may be used for this purpose as well.

In the illustrative embodiment, as shown in FIG. 1, the Bluetooth transceiver 132 couples VR or AR enabled display enabled glasses or goggles (not shown) to the mobile wireless platform 100 to output extracted images in one of three modes as discussed more fully below. In another embodiment, the display is an onboard 3D display with integrated eye-tracking capability such as that currently offered by LG as the DX2000 display.

Figure 4:
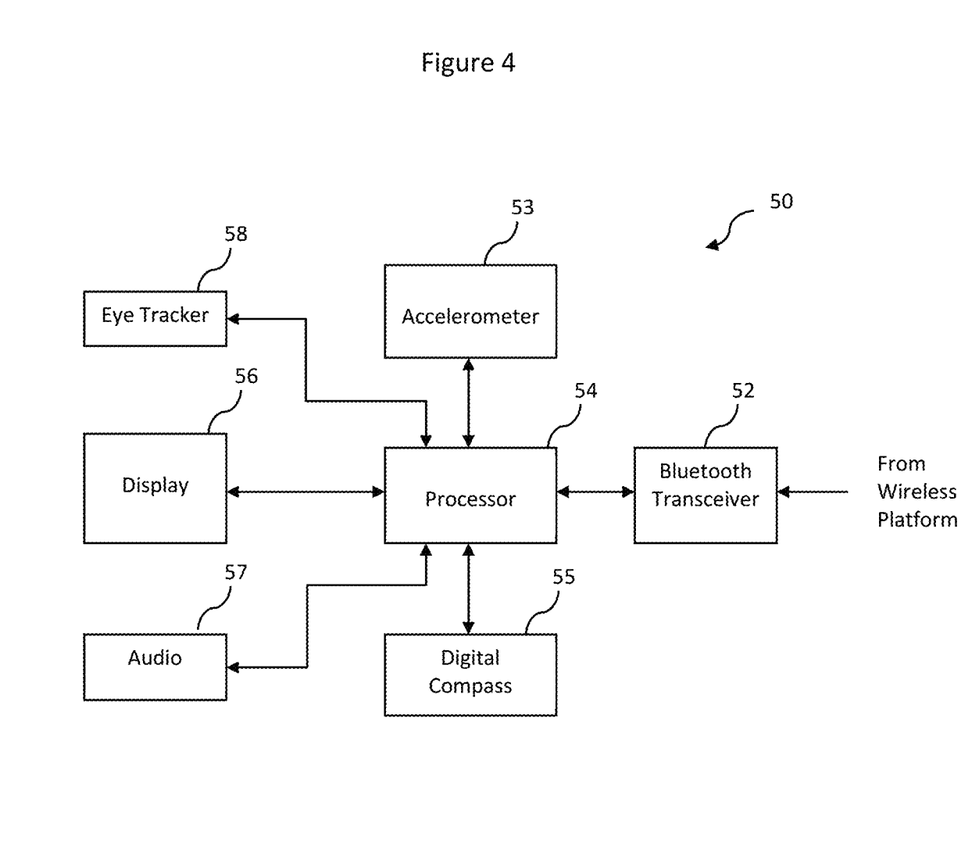
FIG. 4 is a block diagram of an illustrative embodiment of a display subsystem adapted for use in connection with the present invention.

FIG. 4 is a block diagram of an illustrative embodiment of a display subsystem 50 adapted for use in connection with the present invention. The inventive display subsystem 50 includes a Bluetooth transceiver 52 coupled to a processor 54. In a goggle implementation, the processor 54 is coupled to a laser (not shown) or other mechanism adapted to output an image on the lens of goggles (not shown), glasses (not shown) or other display device 56 such as the screen of a Smartphone or tablet, free space display, desktop monitor or a standalone wired or wireless display.

In the goggle embodiment, in accordance with the present teachings, a miniature solid-state electronic compass 55 is included within the frame of the goggle along with an accelerometer 53 and an eye tracker 58. Eye tracking in goggles is known in the art. See SensoMotoric Instruments (SMI) of Boston, Mass. (http://www.eyetracking-glasses-.com/?gclid=CLWogJqhxq4CFYEBROodRGkrVw)

In the best mode, the goggles or virtual glasses worn by each user are optionally detected and electronically removed from the live avatar imagery depicted at the receiver. In addition, and as an alternative, the components of the inventive goggle system may be implemented as an add-on or retrofit for a user's conventional glasses, prescription or otherwise. Ear buds or other audio output devices 57 are included as is common in the art.

Figure 5:
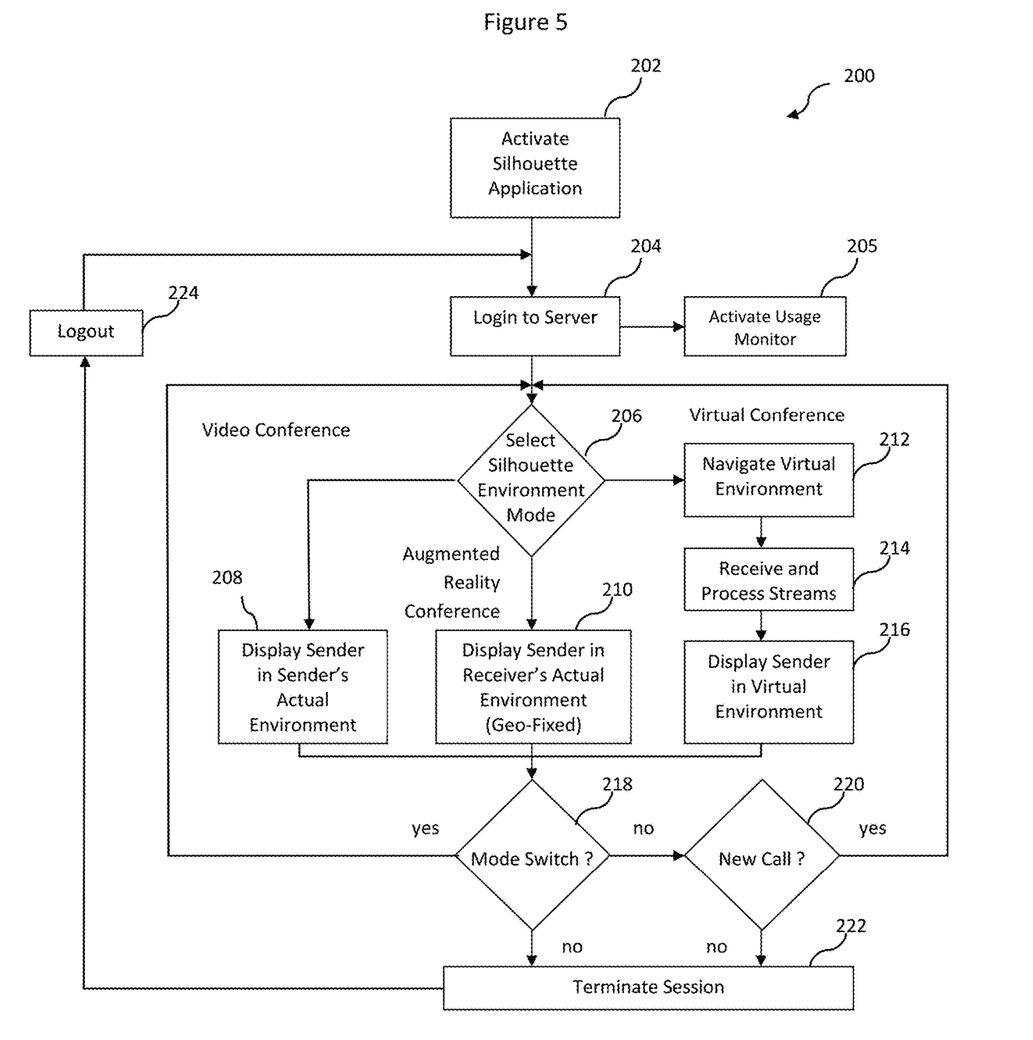
FIG. 5 is a flow diagram of an illustrative embodiment of the technique for capturing and displaying Silhouette images on mobile wireless platforms of the present invention.
Figure 6A:
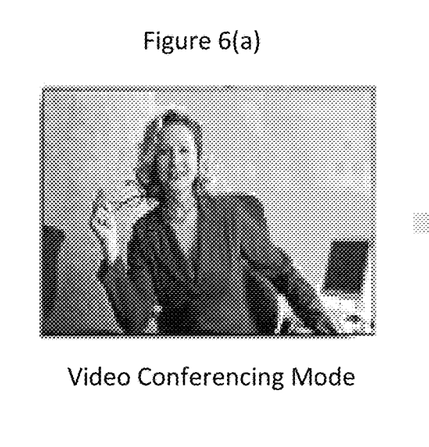
FIG. 6 is a set of diagrams that illustrate the unique multi-mode conferencing capability of the present invention.
Figure 6B:
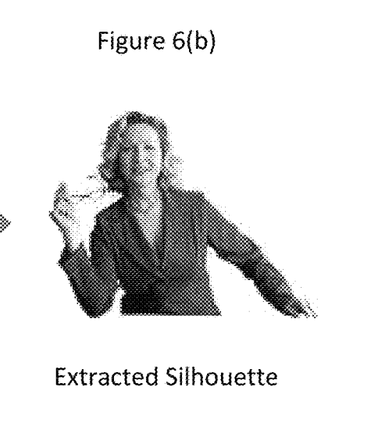
Figure 6C:
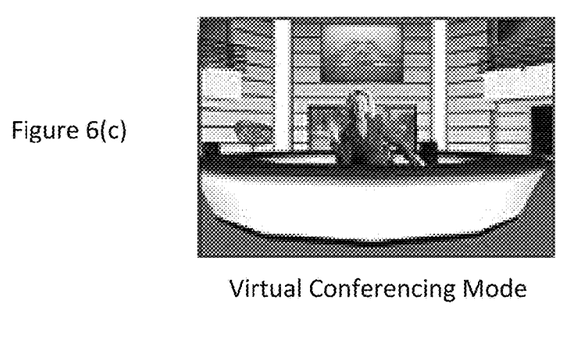
Figure 6D:
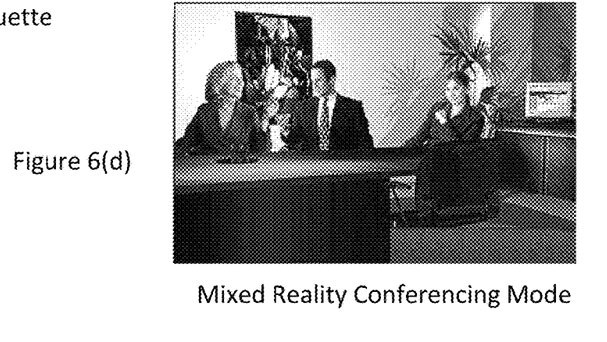

FIG. 5 is a flow diagram of an illustrative embodiment of the technique for capturing and displaying Silhouette images on mobile wireless platforms of the present invention. At step 202, a local user of the wireless platform 100 activates the Silhouette applet or application 108 (see FIGS. 1 and 2) and at step 204 logs into the Silhouette server 20. At this point, a usage monitor 205 is activated. The usage monitor runs preferably, but not necessarily, at the server 20 and maintains a database of data relating to the duration of time for which each live video avatar stream is received by the user in accordance with the teachings of the above-referenced Benman patents.

Multi-Mode Operation:

In accordance with the present teachings, the system 100 is adapted to provide Silhouette live video avatar communication in a computer generated (virtual reality or VR) environment; an augmented reality (AR) environment or a simple video conferencing mode with or our without the user's background being extracted using the techniques disclosed herein.

In accordance with the present invention, after a successful login to the server at step 204 and achieving account authentication, etc., the user is given a prompt to select a Silhouette environment mode for the session at step 206. In the best mode, a voice recognition system is provided to enable the user to select the desired mode via speech or voice input. Nonetheless, manual selection is contemplated within the scope of the present teachings as well.

If, at this step, the user selects a conventional videoconference, then at step 208, a sender with whom the user is ultimately connected is displayed in the sender's actual environment in accordance with a typical conventional video-conferencing call while the user may be seen on the remote end by the sender as extracted without his or her actual background. This affords considerably more privacy for video conferencing compared to conventional solutions such as Zoom or Skype in which the user's home is on display in the background for a video-conferencing call that may be broadcast on television to millions as was the case during the Covid-19 pandemic in 2020. This problem is obviated with the technology disclosed and claimed in the present application.

If at step 206 the user selects an augmented reality (i.e. a free-space) conference mode, then at step 210, the user is ultimately connected to one or more senders and each sender is displayed in the user's actual environment. In this case, the remote senders are displayed via virtual goggles or a free space display. In the goggle mode, the positions of the senders are fixed in the user's actual environment such that when the local user moves his or her head, the remote sender's position in the local user's environment remains unchanged. This compensation is achieved by the goggle processor 54 or the platform processor 110 using data from the three-axis linear and rotational accelerometer 53 and onboard compass 55 and thereby effects a geo-fixing of the sender in the user's environment.

While the remote sender is geo-fixed in the local user's environment, the remote sender remains free to move about in her environment. In the illustrative embodiment, this movement will cause the remote sender to move about in the local user's environment as well assuming the remote user is utilizing the Silhouette technology disclosed herein.

In accordance with the present invention, in a blended reality mode, multiple cameras and/or depth sensors are deployed around the local user's actual environment, or the remote sender's actual environment, so that the user's environment is accurately mapped to provide a corresponding virtual environment at 1:1 scale. In this case, the virtual environment may be shown or not shown (totally transparent) but simply used for reference as to the location of the participants enabling their positions to be displayed in a realistic and accurate manner.

This would be particularly useful in certain applications such as a conference room whereby the local user is able to sit at a real or virtual table and see each participant seated around the table as though present in the local user's mixed or augmented reality space using Silhouette as described in the above-referenced Benman patents and modified herein.

If, at step 206, the user selects a Silhouette virtual conference, then at step 212, the user navigates a virtual world and, when in range and line of sight of other users, receives and processes live video avatar streams from other users at step 214. These 'other users' or 'senders' are then displayed in the virtual environment at step 216 as per the teachings of the above-referenced Benman patents which have been incorporated herein by reference.

The unique multi-mode conferencing capability of the present invention is illustrated in FIG. 6. FIG. 6(*a*) shows a sender in her actual background and depicts a conventional video conferencing image seen by a receiver per step 208 of FIG. 5.

In the event the receiver selects at step 206 (FIG. 5) either the augmented reality conferencing mode or the virtual conferencing mode, then a Silhouette image of the sender is extracted as shown in FIG. 6(*b*). This extracted Silhouette may then be displayed in a computer generated virtual (3D) environment in the virtual conferencing mode of step 216 (FIG. 5) as depicted in FIG. 6(*c*).

In accordance with the present teachings, if the augmented reality conferencing mode is selected at step 206, the extracted Silhouette of the sender is depicted in the receiver's actual environment as shown in FIG. 6(*d*). In the best mode, this is achieved with the novel goggle system disclosed herein.

As an alternative, another technique may be used for a mixed or augmented reality free-space display such as the Heliodisplay™ sold by IO2 Technology of San Bruno, Calif. (http://www.io2technology.com/).

In the best mode, the extracted and transplanted live video avatars used for the augmented reality conference mode as well as the virtual conference mode are three-dimensional (3D) avatars. This is achieved using an onboard 3D depth sensing camera system such as that provided by the Apple's iPhone X class smartphones with TrueDepth cameras, HTC EVO 3D, LG Optimus 3D and Sharp Aquos SH-12C model smart phones or a 2D camera and software processing such as the capability provided by Extreme Reality Ltd of Israel (http://xtr3d.com/technology.html). As another alternative, an external camera, such as a Microsoft's Kinect may be coupled, wirelessly or via a wired connection, to the platform to provide 3D imagery.

In addition, a particularly novel aspect of the present invention is the provision of a live 3D avatar in a video conferencing mode. In this 'hyper-realism' mode, implemented in software in accordance with the present teachings, a user's background (either the sender's, the receiver's or another real world environment) is rendered preferably in 3 dimensions. The extracted Silhouette live avatars are then transplanted into the 3D (or 2D) rendering of the real world environment for presentation in a virtual conferencing mode or augmented reality mode in accordance with the present teachings.

Returning to FIG. 5, at step 218, during or after any session using either of the three above-described modes (video, mixed reality or virtual conferencing), the user is enabled to effect a mode switch. This may be achieved via a button or icon activation or via an audio (speech enabled) or video (gesture enabled cue. If a mode switch is desired, at step 218 the system returns to mode selection step 206. If mode switching is not desired, then at step 218, the user is given an option to initiate a new call.

If, and whenever, a new call is desired, the system first enables voice or manual selection of a user from a contact list or phone number or virtual address (not shown) and again returns to step 206. If no new call or mode switch is desired, then at step 222 the session is terminated and at step 224 the user logs off.

Automatic Display and Camera Following:

In the best mode, the system 10 includes software stored in memory 142 for tracking the local user's position in the local user's actual environment and sending the incoming streams from the server to the local user's smartphone, tablet, laptop, desktop, television, internet enabled appliance, free space display, cave or etc. to allow the user to move about in his or her environment without interruption of the VR or AR conferencing session. In this process, the system will automatically activate each display as the user comes into range and looks in the direction of each display, in a multiple display setup, using facial recognition technology. Simultaneously, the system will activate cameras, located on or near these devices or distributed throughout the user's environment, to follow the user to provide continuous live video extraction of the user during the session and subject to muting per the voice or other commands and/or preferences of the user.

VR to AR Transition and Vice Versa:

In an alternative 'blended reality' or 'BR' mode of operation, the system 10 is programmed to enable the user to move seamlessly from Silhouette VR mode to Silhouette AR mode. In this mode, a user might engage someone in the Nexos or some other VR environment using Silhouette and then continue the conference in the user's real world environment in an AR mode and vice versa. The system 10 may effect this in a number of ways including simply automatically switching the incoming live video streams to the user's AR display instead of the VR display in the manner disclosed above or upon voice command.

In the blended reality embodiment, the system 10 sends either a 2D rendering or a 3D rendering of the local user's environment to the remote user(s) to enable navigation by the remote user(s) in the local user's environment. This will require the user to scan his or her environment with a camera with software, preferably on the sending system, that converts the image to 3D. Many programs are currently available for this purpose. See for example Make3D: https://www.google.com/url?sa=t&rct=j&cq=&esrc=s&source=web&cd=2&ved=2ahUKEwiY3P6SysrfAh-VijlQKHTpbAYgQFjABegQIABAC&url=http%3A%2F%2Fwww.cs.cornell.edu%2F~asaxena%2Freconstruction3d%2Fsaxena_make3d_learning3dstructure.pdf&usg=AOvVaw26XypG_caxFsdNGWkh6A-Y.

By 'navigation functionality', we mean enabling User 2 to move around in User 1's environment and vice versa. This can be accomplished using the iPhone X to capture each User 1's environment (User 1 holds up the phone and turns around to capture a 360 view) . . . the iPhone then detects and renders the surfaces in the environment. Those surfaces are sent to User 2 allowing User 2 to navigate within User s environment.

By 'multi-user functionality' we mean allowing multiple users to share the same environment simultaneously in real time using Silhouette. This would require each person's stream to be sent to the others, as would be the case in a conference call but with streaming live video avatars per our technology.

Other Alternative Embodiments

Thus, the invention has been disclosed as including a depth sensor for creating a depth map based first live video avatar of a user or object disposed in a heterogeneous first environment with an arbitrary background; a processor coupled to the depth sensor; code fixed in a tangible medium for execution by the processor for extracting the depth map from the first environment to provide an extracted depth map based live video avatar; and a display system coupled to the processor for showing the extracted depth map based live video avatar in a second environment diverse from the first environment.

In a second embodiment, the system has been disclosed as including a camera coupled to the processor to provide live video images of the user in the first environment and code for spatially filtering the images to provide a spatially filtered extracted second live video avatar. This embodiment further includes code for combining the first live video avatar with the second live video avatar to provide an enhanced extracted depth map based third live video avatar. Images from multiple cameras and or depth sensors are combined simultaneously to provide the third live video avatar using the spatially enhanced extracted depth map.

In a third embodiment, the inventive system includes code for extracting a live video avatar from film or video. Another embodiment includes an arrangement with multiple displays for sensing a position of a user with automatic camera, display, microphone and or speaker activation and switching based on user position and viewing angle.

A routing server is disclosed for receiving streams from multiple users and sending to each user the live video avatar images from other users based on their locations in a shared space or for use in a local user's AR environment.

The display may be holographic, distributed, free space and/or optical (glass or goggles). In the best mode, an arrangement is included for providing a heads up display showing where users are onscreen.

The system can include code for enabling voice activation along with code for enabling automatic signaling by which navigation into someone's virtual space prior to connecting through the routing server will ping (via text or call) his or her phone to meet you at your coordinates in the virtual world from wherever he or she is in reality. The system can include code for effecting gaze correction, beautification and/or age reduction. The software can include code for providing a heads up display showing where users are onscreen, hyper-realism (enhancement of augmented reality environments), persistent (always present in the second environment) experience, age and gender filtering. Further, code may be included for enabling automatic signaling by which navigation into someone's virtual room or office will ping his or her phone to meet you there wherever he or she is in reality.

The present invention has been described herein with reference to particular embodiments for a particular application. Those having ordinary skill in the art and access to the present teachings will recognize additional modifications, applications and embodiments within the scope thereof. For example, it should be noted that Silhouette's live video user stream can be interlaced with a virtual key manually passed in-world to provide for access to secure computers, systems and/or network assets.

It is therefore intended by the appended claims to cover any and all such applications, modifications and embodiments within the scope of the present invention.

Accordingly,

The invention claimed is:

1. A system for extracting and transplanting live video image streams comprising:
  an image sensor for providing a live video image stream of a first user or object disposed in a heterogeneous first environment with an arbitrary background;
  a processor operationally coupled to the image sensor to receive the live video image stream;
  code stored in a non-transitory tangible medium for execution by the processor for extracting a live video image stream of the first user from the live video image stream of the arbitrary background of the heterogeneous first environment to provide an extracted live video image stream of the first user;

a mobile display system coupled to the processor for showing the extracted live video image stream to a second user in a second environment separate and distinct from the first environment, said second environment being an augmented reality environment including at least part of said second user's second environment; and said code further including code for geo-fixing a location of the live video image stream of the first user in the second environment for viewing by the second user, whereby movement of the mobile display by the second user does not change the position of the first user in the second user's environment.

2. The system of claim 1 wherein the image sensor includes a depth sensor.

3. The system of claim 2 wherein the code further includes code for combining the first live video image stream with a second live video image stream from the depth sensor to provide an enhanced extracted depth map based third live video image stream.

4. The system of claim 3 wherein the code further includes code for combining images from multiple cameras or depth sensors simultaneously to provide the third live video image stream.

5. The system of claim 1 further including multiple displays.

6. The system of claim 5 including an arrangement for sensing a position of a user with a camera or microphone and automatically selectively activating a display based on user position and viewing angle in response thereto.

7. The system of claim 1 further including multiple cameras.

8. The system of claim 7 wherein the code further includes code for effecting automatic camera activation based on a user's position in a user's environment.

9. The system of claim 1 further including an arrangement for sending the extracted live video image stream from the first user to the second user via a routing server.

10. The system of claim 9 further including a second arrangement for receiving said extracted live video image stream from said routing server and displaying the live video stream to the second user.

11. The system of claim 1 wherein the display includes augmented reality goggles, augmented reality glasses or a free space display.

12. The system of claim 1 wherein the processor is mounted on a first platform and the display is mounted on a second physically separate platform.

13. The system of claim 12 wherein the second platform includes a second processor for executing code fixed in a non-transitory tangible medium for effecting a user selectable multimode display operation, said multimode operation including a video conferencing mode, a virtual conferencing mode and a mixed reality conferencing mode.

14. The system of claim 13 wherein the code further includes code for displaying extracted image data in each of said modes.

15. The system of claim 1 wherein the system includes a system for transplanting the extracted live video image stream into a computer rendered hyper-realistic augmented reality representation of a user's environment.

16. The system of claim 15 wherein the code further includes code for enabling a user to experience said hyper-realistic augmented reality representation of the user's environment as a blended reality environment.

17. The system of claim 15 further wherein the code further includes code for enabling a second user to be present in said hyper-realistic environment by which the first user's environment is rendered in virtual reality.

18. A system for extracting and transplanting live video image streams comprising:

a computing and communications platform;

a sensor coupled to the platform for creating first live video image stream of a user or object disposed in a heterogeneous first environment with an arbitrary background;

a first processor coupled to the sensor;

code stored in a non-transitory tangible medium for execution by the first processor for extracting live video image stream of a first user from the live video image stream of the arbitrary background of the heterogeneous first environment to provide an extracted depth map based live video avatar;

a routing server;

a second platform having a second processor coupled to the routing server; and code stored in a non-transitory tangible medium on the second platform for receiving the live video image stream from the routing server and for causing a display system coupled to the second processor to show the extracted live video image stream in a second environment independent from the first environment, said second environment being an augmented reality environment and said code further including code for geo-fixing a location of the live video image stream of the first user in the second environment for viewing by a second user, whereby movement of the display system by the second user does not change the position of the first user in the second user's environment.

* * * * *